July 14, 1953     S. A. FOSTER     2,645,020
ACCURATELY REPEATING DIAL TYPE COMPARATOR
Filed Jan. 7, 1950
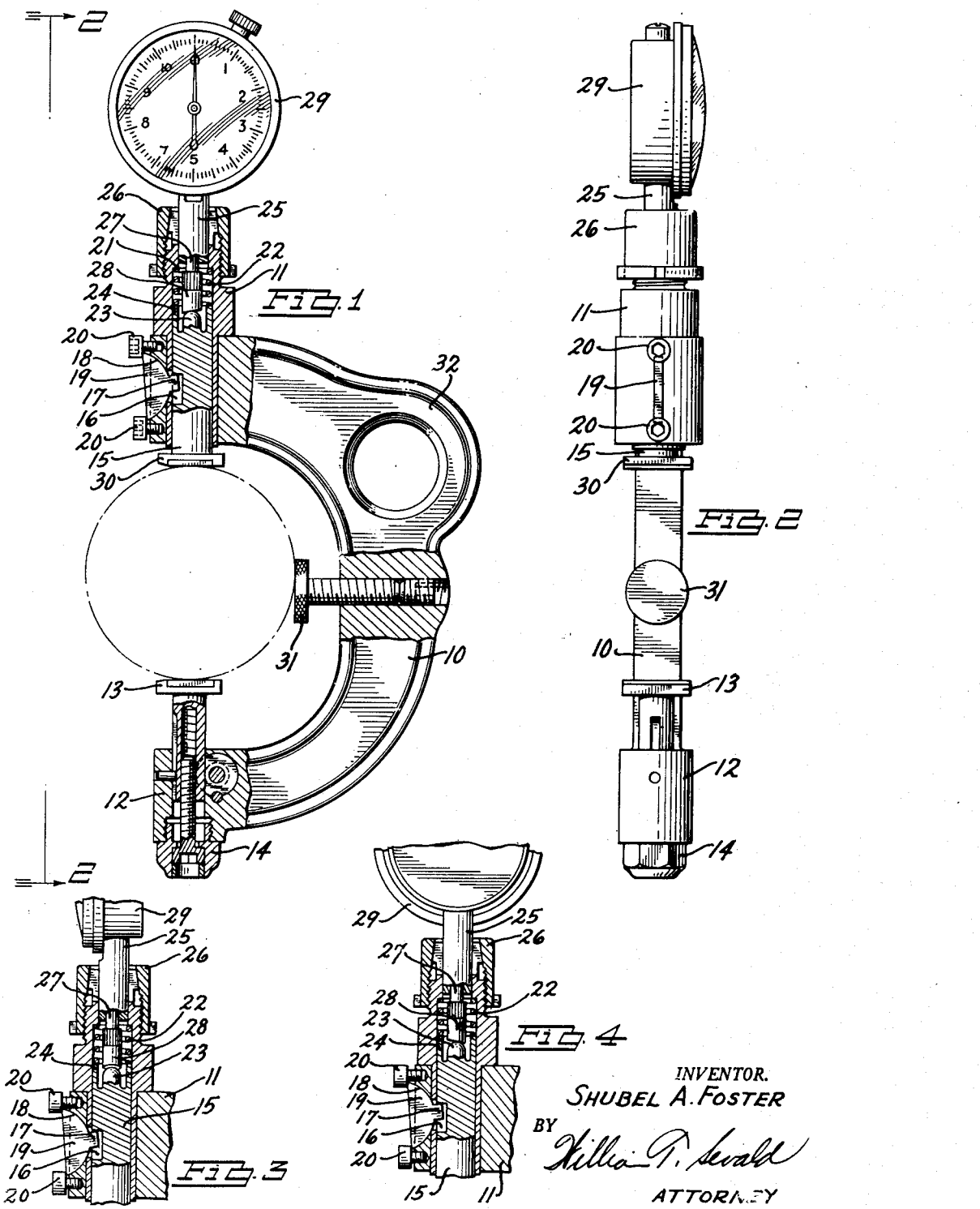
INVENTOR.
SHUBEL A. FOSTER
BY
ATTORNEY

UNITED STATES PATENT OFFICE 2,645,020

ACCURATELY REPEATING DIAL TYPE COMPARATOR

Shubel A. Foster, Birmingham, Mich.

Application January 7, 1950, Serial No. 137,429

6 Claims. (Cl. 33—147)

This invention relates to mechanical transmission of movement and means therefor and in particular to an accurately repeating dial micrometer employing a spherical head in conjunction with its traveling anvil and a flat beveled end on its dial stem contacting the spherical head for transmitting movement of the traveling anvil to the dial to establish dimension via the spherical head and the beveled end.

Micrometers and other devices requiring accurate transmission of movement capable of accurate repetition without intermediate adjustment have employed various means such as crosspins, threaded joints, etc., to transmit movement and establish dimension; however, the several devices of the prior art have not proven entirely satisfactory inasmuch as the play, relative position and/or inaccuracy between the parts usually causes a different reading on the micrometer when repeatedly measuring the same article or different articles of the same size.

With the foregoing in view, the primary object of the invention is to provide accurate means for transmitting movement axially from one shaft to another which is capable of non-variable repetition as read on highly sensitive instruments.

An object of the invention is to provide a spherical or hemispherical head on one shaft or part and a flat tapered or beveled end on the companion part for abutting the spherical or hemispherical head so that the identical contact is achieved and the identical influence is exerted at every repetition of movement.

Other objects of the invention will become apparent by reference to the following description of an accurately repeating dial micrometer employing the axial joint taken in connection with the accompanying drawing, in which:

Fig. 1 is a side elevational view of a micrometer employing the inventive joint with portions shown in longitudinal cross-section to better illustrate the parts thereof.

Fig. 2 is a side elevational view of the device.

Fig. 3 is a partial view of the device similar to Fig. 1 showing the parts of the device in altered position; and Fig. 4 is a partial view of the device similar to Fig. 1 showing the parts of the device in altered position from both Fig. 1 and Fig. 3.

Referring now to the drawing wherein like numerals refer to like and corresponding parts throughout the several views, the dial micrometer and joint disclosed therein to illustrate the invention comprises a double ended yoke 10, a block 11 having a chamber disposed therein on one end of the yoke 10, a second block 12 disposed on the other end of the yoke 10 opposite to the block 11, a stationary anvil 13 disposed in the block 12, adjusting mechanism 14 associated with the block 12 for adjustably positioning the stationary anvil 13 relative to the block 12, a traveling plunger 15 having a longitudinal keyway 16 disposed in the chamber of the block 11 adapted to travel toward and away from the stationary anvil 13, a key 17 in the block 11 extending into the keyway 17 of the plunger 15 preventing relative rotation between the plunger 15 and the block 11 and permitting limited relative endwise movement between the key 17 and the plunger 15 via the keyway 16, an arcuate seat 18 in the block 11 adjacent the key 17, a correspondingly arcuate body 19 on the key 17 seated on the seat 18 adapted to rock therein to adjust the longitudinal position of the key 17 relative to the block 11 for in turn adjusting the limited relative endwise movement of the plunger 15 in the block 11, bolts 20 securing the head 19 in adjusted position relative to the block 11, a seat 21 within the chamber of the block 11, a spring 22 disposed within the chamber of the block 11 seated on the seat 21 compressed against the upper end of the plunger 15 permitting the plunger 15 to travel off the key 17 against its compression and capable of returning the plunger 15 to the key 17, a spherical or hemispherical end 23 on the inner end of the plunger 15, a collar 24 surrounding the end 23 disposed between the plunger 15 and the spring 22, a dial stem housing 25 disposed within the chamber of the block 11 axially aligned with the plunger 15, a fitting 26 securing the dial stem 25 to the block 11, a spring-pressed dial stem 27 within the housing 25, a flat beveled or tapered end 28 on the dial stem 27 contacting the spherical end 23 on the plunger 15 for accurately transmitting plunger 15 movement to the dial stem 27, a traveling anvil 30 on the plunger 15, an adjustable, intermediate anvil 31 on the yoke 10 for limiting the depth of insertion of an object to be measured when inserted between the stationary anvil 13 and the traveling anvil 30 and a finger grip 32 facilitating handling of the device.

Relative to the relation between the beveled end 28 and the spherical head 23, it can be seen from Figs. 1, 3 and 4 that any point on the hemispherical head will provide a suitable contact between the beveled end 28 and the spherical head 23. Relative to the position of the tapered or beveled end 28 on the stem 27 again any circumferential point is suitable, however, it is preferable to position the tapered or beveled end 28 relative to the stem 27 so that the thrust of the taper against the stem 27 is absorbed by the strongest and least distortable part of the mechanism of the dial gauge 29 so as not to put undue strain on the rack or sector within the gauge 29. In this connection the face of the dial 29 can be positioned to the desires of the user relative to the yoke 10 as indicated in Figs. 1, 3 and 4.

The collar 24 can be formed integral with the plunger 15 or manufactured separately or entirely deleted. However, when formed integral with the plunger 15, the collar 24 provides additional bearing surface within the chamber of the block 11 against side thrust on the plunger 15. Due to the fact that the contacting head 23 of the plunger 15 is spherical and the end 28 on the stem 27 is tapered, the identical thrust is transferred from the plunger 15 to the stem 27 with each repeating movement of the traveling anvil 30; and, due to the fact that the spherical head 23 is specially hardened, wear between the parts is absorbed by the tapered end 28 which is easily ground to eliminate imperfection in its surface. A 5 degree bevel on the end 28 has been found suitable, however, a larger or smaller degree bevel may be employed if desired.

The key 17 is disposed in the keyway 16 of the plunger 15 between the end walls thereof and is attached to the arcuate head 19 rockably positioned on the arcuate seat 18 in the block 11 with the bolts 20 adjustably securing the head 19 relative to the seat 18 thereby securing the key 17 in fixed adjustable position. If the bottom bolt 20, Fig. 1, is loosened and the top bolt 20 is tightened, the head 19 will rock on the seat 18 pivoting the key downwardly thereby changing the position travel of the plunger 15 relative to the block 11. In this way the plunger 15 can be positioned for relative travel from a definite point which is adjustable via the screws 20, seat 18, and head 19.

The operation of the device can best be explained in conjunction with a specific use such as in employing the inventive dial micrometer to measure the size of main bearings being ground on a crankshaft wherein the operator grinds the bearings to the same dimension and measures each bearing with the inventive dial micrometer during grinding and at the termination of grinding, and, in this regard it can be seen that the user or operator can set the inventive device employing gauge blocks to the desired measurement and then use the device repeatedly throughout his day's work, without the device varying from its set dimension from one measurement to the other.

Although but a single embodiment of the invention has been shown and described in detail, it is obvious that many changes may be made in the size, shape, detail and arrangements of the elements of the invention within the scope of the appended claims.

I claim:

1. In an instrument for measuring and indicating minute distances, a yoke having a plunger chamber in one end thereof, a stationary anvil on said yoke oppositely disposed to and axially aligned with the plunger chamber of said yoke, a seat on said yoke within the chamber, a plunger having a keyway endwise movably disposed in the chamber of said yoke below said seat, a traveling anvil on said plunger oppositely disposed to said stationary anvil, a hemispherical interior end on said plunger, a collar on said plunger surrounding said hemispherical end, a spring disposed under compression between said yoke chamber seat and said plunger collar, a key extending from said yoke into the keyway of said plunger providing a stop for said plunger against said spring; said plunger being capable of travel against said spring; a dial gauge mounting on said yoke at the plunger chamber and axially aligned therewith, a dial gauge set in said mounting, a stem extending from said dial gauge into the plunger chamber of said yoke, and a 5 degree flat beveled end on said stem contacting said hemispherical end on said plunger whereby movement of said traveling anvil is transmitted to said dial gauge via said plunger and said stem with said hemispherical end of said plunger and said flat tapered 5 degree beveled end on said stem providing non-varying transmission of movement from said traveling anvil to said dial gauge each time the same measurement is made.

2. An accurately repeating micrometer comprising a double ended yoke, a block having a chamber disposed on one end of said yoke, a second block disposed on the other end of said yoke opposite to said block, a stationary anvil adjustably disposed in said second block, a traveling plunger disposed in the chamber of said block adapted to travel toward and away from said stationary anvil, a spring seated within the chamber of said block compressed against the end of said plunger permitting said plunger to travel against its compression and capable of returning said plunger, a hemispherical inner end on said plunger, a gauge stem housing disposed within the chamber of said block axially aligned with said plunger, a fitting securing said gauge stem housing to said block, a spring-pressed gauge stem within said housing, a flat 5 degree beveled end on said gauge stem contacting said hemispherical end on said plunger for accurately transmitting plunger movement to said gauge stem, and a gauge on said gauge stem visually indicating movement of said gauge stem.

3. An accurately repeating micrometer comprising a double ended yoke, a block having a chamber disposed on one end of said yoke, a second block disposed on the other end of said yoke opposite to said block, a stationary anvil adjustably disposed in said second block, a traveling plunger having a longitudinal keyway disposed in the chamber of said block adapted to travel toward and away from said stationary anvil, a key in said block extending into the keyway of said plunger preventing relative rotation between said plunger and said block and permitting limited relative endwise movement therebetween, a spring sealed within the chamber of said block compressed against the end of said plunger permitting said plunger to travel off said key against its compression and capable of returning said plunger to said key, a hemispherical inner end on said plunger, a gauge stem housing disposed within the chamber of said block axially aligned with said plunger, a fitting securing said gauge stem housing to said block, a spring pressed gauge stem within said housing, a flat 5 degree beveled end on said gauge stem contacting said hemispherical end on said plunger for accurately transmitting plunger movement to said gauge stem, and a gauge on said gauge stem visually indicating movement of said gauge stem.

4. An accurately repeating micrometer comprising a double ended yoke, a block having a chamber disposed on one end of said yoke, a second block disposed on the other end of said yoke opposite to said block, a stationary anvil adjustably disposed in said second block, a traveling plunger having a longitudinal keyway disposed in the chamber of said block adapted to travel toward and away from said stationary anvil, a key in said block extending into the keyway of said plunger preventing relative rotation between said plunger and said block and permitting limited relative endwise movement therebetween, a spring seated within the chamber of said block compressed against the end of said plunger permitting said plunger to travel off said key against its compression and capable of returning said plunger to said key, a hemispherical inner end on said plunger, a gauge stem housing disposed within the chamber of said block axially aligned with said plunger, a fitting securing said gauge stem housing to said block, a spring pressed gauge stem within said housing, a flat 5 degree beveled end on said gauge stem contacting said hemispherical end on said plunger for accurately transmitting plunger movement to said gauge stem, a gauge on said gauge stem visually indicating movement of said gauge stem, and an intermediate anvil on said yoke for limiting the depth of insertion of an object to be measured when inserted between said stationary anvil and said traveling anvil.

5. An accurately repeating micrometer comprising a double ended yoke, a block having a chamber disposed on one end of said yoke, a second block disposed on the other end of said yoke opposite to said block, a stationary anvil adjustably disposed in said second block, a traveling plunger having a longitudinal keyway disposed in the chamber of said block adapted to travel toward and away from said stationary anvil, a key in said block extending into the keyway of said plunger preventing relative rotation between said plunger and said block and permitting limited relative endwise movement therebetween, a spring seated within the chamber of said block compressed against the end of said plunger permitting said plunger to travel off said key against its compression and capable of returning said plunger to said key, a hemispherical inner end on said plunger, a collar surrounding said hemispherical end disposed between said plunger and said spring, a gauge stem housing disposed within the chamber of said block axially aligned with said plunger, a fitting securing said gauge stem housing to said block, a spring pressed gauge stem within said housing, a flat 5 degree beveled end on said gauge stem contacting said hemispherical end on said plunger for accurately transmitting plunger movement to said gauge stem, and an intermediate anvil on said yoke for limiting the depth of insertion of an object to be measured when inserted between said stationary anvil and said traveling anvil.

6. An accurately repeating micrometer comprising a double ended yoke, a block having a chamber disposed on one end of said yoke, a second block disposed on the other end of said yoke opposite to said block, a stationary anvil adjustably disposed in said second block, a traveling plunger having a longitudinal keyway disposed in the chamber of said block adapted to travel toward and away from said stationary anvil, a key in said block extending into the keyway of said plunger preventing relative rotation between said plunger and said block and permitting limited relative endwise movement therebetween, an arcuate seat on said block, a correspondingly arcuate body on said key seated on said seat adapted to rock therein to adjust the longitudinal position of said key relative to said block for in turn adjusting the limited relative endwise movement of said plunger in said block means securing said key-body in adjusted position, a spring seated within the chamber of said block compressed against the end of said plunger permitting said plunger to travel off said key against its compression and capable of returning said plunger to said key, a hemispherical inner end on said plunger, a collar surrounding said hemispherical end disposed between said plunger and said spring, a gauge stem housing disposed within the chamber of said block axially aligned with said plunger, a fitting securing said gauge stem housing to said block, a spring pressed gauge stem within said housing, a flat 5 degree beveled end on said gauge stem contacting said hemispherical end on said plunger for accurately transmitting plunger movement to said gauge stem, a gauge on said gauge stem visually indicating movement of said gauge stem, and an intermediate anvil on said yoke for limiting the depth of insertion of an object to be measured when inserted between said stationary anvil and said traveling anvil.

SHUBEL A. FOSTER.

References Cited in the file of this patent

UNITED STATES PATENTS

| Number | Name | Date |
| --- | --- | --- |
| 1,664,583 | Wheelock | Apr. 3, 1928 |
| 1,892,969 | Schneider | Jan. 3, 1933 |
| 2,139,251 | Aller | Dec. 6, 1938 |
| 2,267,559 | Foster | Dec. 23, 1941 |
| 2,419,433 | Aller | Apr. 22, 1947 |
| 2,424,497 | Nilsson | July 22, 1947 |
| 2,445,875 | Emery | July 27, 1948 |
| 2,556,761 | Keene | June 12, 1951 |

FOREIGN PATENTS

| Number | Country | Date |
| --- | --- | --- |
| 260,609 | Switzerland | Aug. 1, 1949 |